US012601652B2

(12) United States Patent
Chu et al.

(10) Patent No.: US 12,601,652 B2
(45) Date of Patent: Apr. 14, 2026

(54) WEIGHT AND CENTER OF GRAVITY MEASUREMENT EQUIPMENT FOR AERIAL VEHICLES

(71) Applicant: VIETTEL GROUP, Ha Noi City (VN)

(72) Inventors: Minh Thanh Chu, Ha Noi City (VN); Quang Duc Tran, Ha Noi City (VN); Van Phuong Do, Ha Noi City (VN); Xuan Quan Cao, Thanh Mien District (VN); Van Khoi Bui, Ha Noi City (VN); Tuan Dung Mai, Dong Hung District (VN)

(73) Assignee: VIETTEL GROUP, Ha Noi City (VN)

( * ) Notice: Subject to any disclaimer, the term of this patent is extended or adjusted under 35 U.S.C. 154(b) by 317 days.

(21) Appl. No.: 18/403,622

(22) Filed: Jan. 3, 2024

(65) Prior Publication Data

US 2024/0361199 A1 Oct. 31, 2024

(30) Foreign Application Priority Data

Apr. 27, 2023 (VN) ................................ 1-2023-02844

(51) Int. Cl.
*G01M 1/12* (2006.01)
(52) U.S. Cl.
CPC .................................... *G01M 1/125* (2013.01)
(58) Field of Classification Search
CPC ....... G01M 1/122; G01M 1/125; G01G 19/07
See application file for complete search history.

(56) References Cited

U.S. PATENT DOCUMENTS

| | | | | | |
|---|---|---|---|---|---|
| 2,722,827 | A | * | 11/1955 | Spencer | G01M 1/12 73/65.05 |
| 9,417,151 | B2 | * | 8/2016 | Fordice | G01M 1/122 |
| 9,933,324 | B2 | * | 4/2018 | Trinko | G01G 23/36 |
| 10,139,303 | B2 | * | 11/2018 | Chang | B64F 5/60 |
| 10,782,201 | B2 | * | 9/2020 | Wang | G01G 21/22 |

FOREIGN PATENT DOCUMENTS

| | | | | | |
|---|---|---|---|---|---|
| CN | 110228604 | A | * | 9/2019 | B64F 5/60 |
| CN | 211281524 | U | * | 8/2020 | |
| CN | 213336400 | U | * | 6/2021 | |
| CN | 115655580 | A | * | 1/2023 | |
| EP | 3407030 | B1 | * | 3/2021 | G01M 1/12 |

* cited by examiner

*Primary Examiner* — John Fitzgerald
(74) *Attorney, Agent, or Firm* — patenttm.us

(57) ABSTRACT

The weight and center of gravity measurement equipment for aerial vehicles, comprising: a base frame, an equipment frame positioned above the base frame, first and second supporting components opposite each other at both equipment frame ends so that the line (A-A) connecting the centers of first and second clamp rings of these two supporting components is parallel to a horizontal plane; the first clamp ring is driven to rotate at predetermined angles α around the line (A-A) by a servo motor through a gearbox; three load sensors arranged in a triangular pattern between the base and equipment frame; a processor receives signals from these load sensors, calculate the vehicle weight and center of gravity based on load values of the vehicle determined by the load sensors at the initial and at each positions where the vehicle rotated at the predetermined angle α, and outputs the results to a display screen.

15 Claims, 12 Drawing Sheets

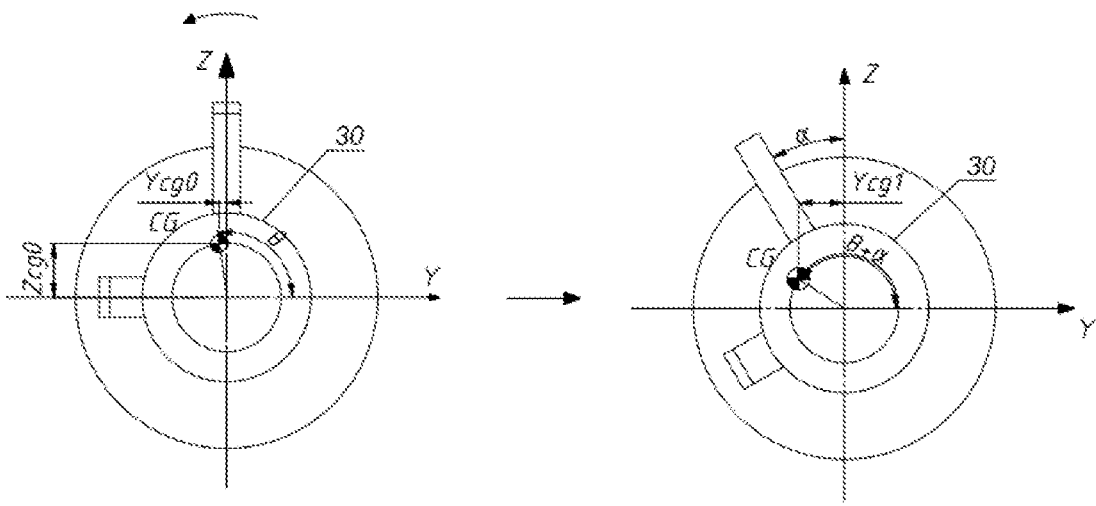
Fig.9b
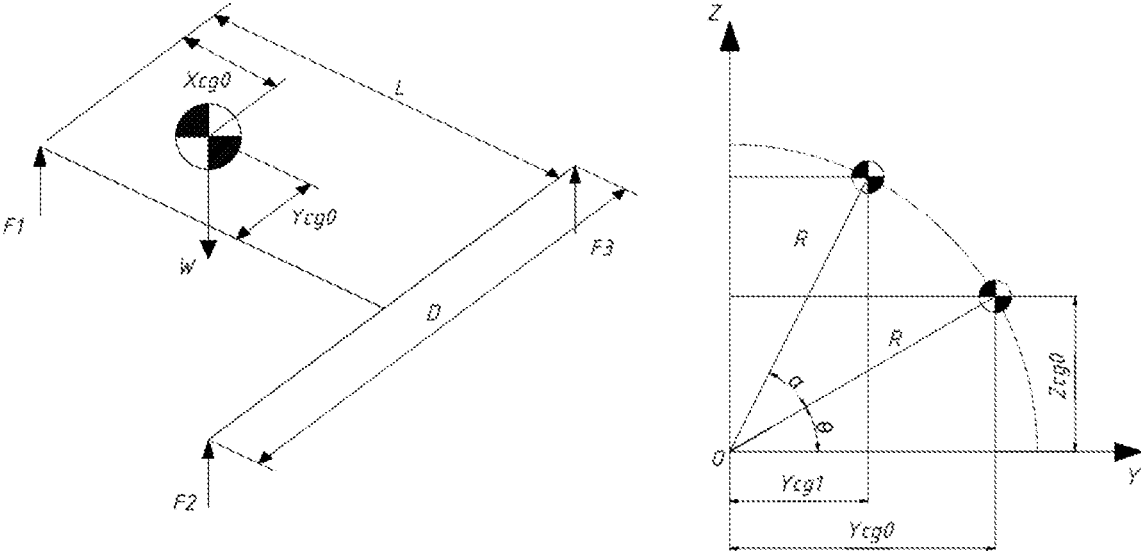
Fig.10a                      Fig.10b

S101: Install the aerial vehicle 30 onto the first clamping ring 101 and the second clamping ring 201 of the equipment

S102: Measure the first load values F1, F2, F3 using the load sensors 301, 302, 303

S103: Calculate the weight and center of gravity coordinates of the aerial vehicle 30 along the X and Y axes at the initial position

S104: Rotate the aerial vehicle 30 around axis A-A by a predetermined angle α

S105: Measure the second set of load values F1', F2', F3' using the load sensors 301, 302, 303

S106: Calculate the weight and center of gravity coordinates along the X, Y, and Z axes of the aerial vehicle at the rotated position with the predetermined angle

S107: Calculate the final coordinates

Fig.11

WEIGHT AND CENTER OF GRAVITY MEASUREMENT EQUIPMENT FOR AERIAL VEHICLES

FIELD OF THE INVENTION

The invention relates to a weight and center of gravity measurement equipment for an aerial vehicle. Specifically, the equipment for determining the weight and center of gravity of an aerial vehicle is addressed as applied in the field of aviation.

BACKGROUND OF THE INVENTION

As known, the weight and center of gravity of an aerial vehicle are crucial parameters for calculating and determining it's trajectory during flight, and these parameters are precisely calculated during the design phase. However, during the manufacturing and assembly of an aerial vehicle, due to various factors, the weight and center of gravity often deviate from the design specifications. Therefore, for the aerial vehicle to be put into use, these deviations must fall within permissible error limits. To determine these discrepancies, there is a need for devices that can measure the weight and center of gravity of the aerial vehicle. However, in Vietnam, there is currently no organization that can manufacture the devices, especially for aerial vehicles with large masses and dimensions.

The Chinese utility model CN211281524U has disclosed the weight and center of gravity measurement equipment for an aerial vehicle. As shown in FIG. 12 of the document, this equipment is constructed with a base frame (1), a rotating table (2) mounted in a way that it can rotate around the pivot axis (3) of the base frame (1) at fixed angles of 0 degrees, ±15 degrees, and ±30 degrees with respect to the horizontal plane. It is fixed in each of these positions by a locking mechanism that consists of positioning plates with locating holes for securing locking pins (4). Three load sensors (5) are distributed in a triangular configuration mounted beneath the base frame (1). To perform measurements, the aerial vehicle is first placed on the device. From the load values determined by the load sensors (5) at the initial position of the aerial vehicle, the coordinates of the center of gravity along the X and Y axes can be calculated using moment balance equations. The determination of the center of gravity coordinate along the Z-axis is achieved by tilting the rotating table (2) at a specific angle. In this case, the center of gravity coordinate along the Z-axis is indirectly calculated using trigonometric equations based on the relationship between the initial center of gravity coordinates and the coordinates after tilting the rotating table.

However, this equipment has a simple design and several disadvantages as follows: It cannot automatically calculate the weight and coordinate values of the aerial vehicle. The calculations are done manually by the user based on load values detected by the sensors at the initial position and the position after tilting the aerial vehicle; It is only suitable for determining the weight and center of gravity of small-sized aerial vehicles and is not appropriate for large-sized aerial vehicles (over 3 meters long) and heavy vehicles (over 1 ton). This limitation is due to the fact that the adjustment of the tilt angle of the rotating table is entirely done manually by the user; additionally, the equipment cannot measure large-sized aerial vehicles since when tilting the rotating table (2), if the aerial vehicle is too long, it may touch the ground or even cause the equipment to tip over.

Currently, there are many modern devices worldwide that can determine the weight and center of gravity of an aerial vehicle with high precision, overcoming the drawbacks mentioned earlier, such as the "Space Electronics Model WCGT1000" by Space Electronics supplier. Despite having several advantages, this equipment also has the following disadvantages:

Firstly, this equipment is designed to measure aerial vehicles in an upright position, which makes it unsuitable for measuring aerial vehicles with a large length along the vertical axis, especially those over 3 meters long. When the rotating table of this equipment rotates by an angle of 30 degrees to determine the coordinate values along the third axis (the Z-axis), the risk of instability is high for vehicles with substantial vertical length in an upright position, which can compromise safety. Therefore, this equipment is only suitable for measuring vehicles with small heights, such as rocket engines or smaller missiles and aerial vehicles with short lengths along the vertical axis.

Secondly, the complex design of the equipment makes it challenging for users to master the technology involved, leading to difficulties in using, maintaining, servicing, and repairing the device.

Faced with these challenges, the inventors realized the necessity for automatic equipment with high precision and technological autonomy to determine the weight and center of gravity of large and sizeable aerial vehicles.

SUMMARY OF INVENTION

The purpose of the invention is to propose automatic equipment for determining the weight and center of gravity of large, one ton or more, and sizeable aerial vehicles with a length of 3 meters or more, with high precision, ease of use, technological autonomy, and to address one or several of the issues mentioned above.

To achieve the stated purpose, the weight and center of gravity measurement equipment for an aerial vehicle is structured as follows:

A rectangular base frame (10).

An equipment frame (20) located above the base frame (10), also in the shape of a rectangle, supporting the first supporting component (100) and the second supporting component (200).

The first supporting component (100) consists of the first clamping ring (101) mounted in a rotatable manner on pairs of rollers (102) fixed to the first support frame (103). The first clamping ring (101) is circular in shape and is used to securely clamp one end of the aerial vehicle (30).

The second supporting component (200) consists of the second clamping ring (201) mounted in a rotatable manner on pairs of rollers (202) fixed to the second support frame (203). The second clamping ring (201) is circular in shape and is used to securely clamp the remaining end of the aerial vehicle (30).

The first supporting component (100) and the second supporting component (200) are arranged opposite each other at the two ends of the equipment frame (20) so that the line (A-A) connecting the centers of the first clamping ring (101) and the second clamping ring (201) of these two supporting components is parallel to the horizontal plane.

The first clamping ring (101) is driven to rotate at predetermined angles α around the line (A-A) mentioned above by a servo motor (104) through a gearbox (105) and a transmission mechanism (106). The transmission mechanism includes a passive gear ring (1061) mounted around the first clamping ring (101) and meshing with the active gear (1062) mounted on the rotating shaft (107) of the gearbox (105).

Three load sensors (301, 302, and 303) are arranged in a triangular pattern between the base frame (10) and the equipment frame (20). The first load sensor (301) is positioned beneath the second support component (200), while the second load sensor (302) and the third load sensor (303) are symmetrically placed beneath the first support component (100) on either side of the vertical plane passing through the line (A-A) mentioned above.

The processor (400) is configured to receive signals from load sensors (301, 302, 303), calculate the weight and center of gravity of the aerial vehicle (30) based on the load values of the aerial vehicle (30) determined by the load sensors (301, 302, 303) at the initial position and at each position where the first clamp ring (101) rotates by a predefined angle $\alpha$, and display the results on the screen of this processor.

In one implementation, each of the first clamp ring (101) or the second clamp ring (201) includes a lower first ring portion (109), a lower second ring portion (209), and an upper first ring portion (110), and an upper second ring portion (210) that are assembled together.

Furthermore, to determine the rotational center of the aerial vehicle, the lower ring portions (109, 209) have fixed jaws (111, 211), and the upper ring portions (110, 210) have movable jaws (112, 212) adjustable in the radial direction of the clamp ring to securely grip the aerial vehicle (30) between these fixed and movable jaws.

In one implementation, the first supporting component (100) also includes a clamping ring orientation mechanism (120) structured with two corresponding orientation grooves (121) created on the two side surfaces of the first clamping ring (101) and orientation ball bearing components (122) fixed to the first support frame (103) so that the ball bearing ends fit into the orientation grooves (121) to orient the first clamping ring (101).

Moreover, the second supporting component (200) also includes a clamping ring orientation mechanism (220) structured with two corresponding orientation grooves (221) created on the two side surfaces of the second clamping ring (201) and orientation ball bearing components (222) fixed to the second support frame (203) so that the ball bearing ends fit into the orientation grooves (221) to orient the second clamping ring (201).

In one implementation, the first support component (100) also includes proximity sensors (130) to detect the predefined angle $\alpha$ of rotation of the first clamp ring (101).

Moreover, the proximity sensors (130) are positioned at corresponding locations to detect specific rotation angles $\alpha$ of the first clamp ring (101), including angles of 0 degrees, ±30 degrees, ±45 degrees, ±60 degrees, and ±90 degrees.

Ideally, it includes three proximity sensors (130) positioned at corresponding locations to detect specific rotation angles $\alpha$ of the first clamp ring (101) at angles of 0 degrees and ±90 degrees.

In one implementation, this equipment also includes a controller (500) configured to receive control commands to rotate the first clamp ring (101) to predefined angles $\alpha$ and control a servo motor (104) to rotate the first clamp ring (101) to the a angles detected by the proximity sensors (130) and stop at each position for a predefined period.

Preferably, the base frame (10) also includes adjustable lifting legs (11) that can change height through adjustment arms (12), allowing users to adjust so that the plane passing through the positions of the load sensors (300) on the base frame (10) is a horizontal plane.

In one implementation, the base frame (10) also includes two lifting mechanisms (13) arranged at the two ends of the base frame to lift the equipment frame (20) when performing maintenance, repair, or replacement of the load sensors (300).

Preferably, each lifting mechanism (13) includes two manually operated screw lifters positioned at the corners of the base frame (10).

In one implementation, the first support component (100) is fixedly attached to the equipment frame (20), and the second support component (200) is designed to be slidably movable along the length of the equipment frame (10) to adjust the distance relative to the first support component (100) to accommodate the length of the aerial vehicle (30).

Even better, the second support component (200) can slide along the length of the equipment frame (10) to change the distance relative to the first support component (100) using a lead screw mechanism (250) with adjusting handles (251).

In one implementation, this equipment also includes U-shaped safety brackets (15) fixed around the base frame (10) to prevent the equipment frame (20) from sliding off the base frame (10) in case of any accidents.

BRIEF DESCRIPTION OF THE DRAWINGS

FIG. 9b is a drawing showing changes in the center of gravity's position on the YZ plane of the aerial vehicle before and after a predetermined angle rotation.

FIG. 10a is a drawing depicting a diagram illustrating the center of gravity's position on the XY plane of the aerial vehicle.

FIG. 10b is a drawing showing a diagram illustrating the center of gravity's position on the YZ plane of the aerial vehicle before and after a predetermined angle rotation.

FIG. 11 is a diagram illustrating the method for determining the center of gravity of the aerial vehicle using the invention's device.

DESCRIPTION OF PREFERRED EMBODIMENT

Figure 1:
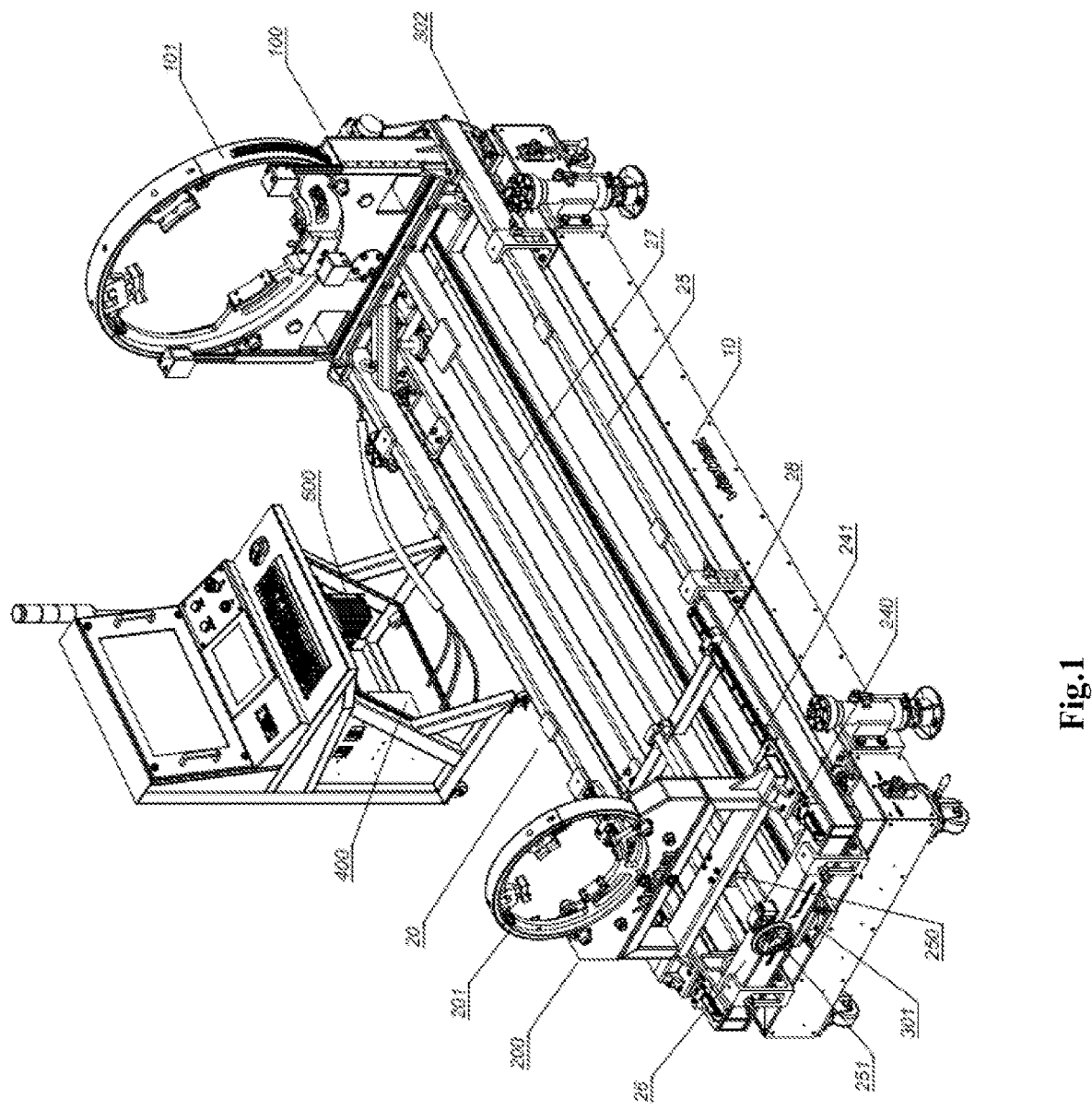
FIG. 1 is an overall isometric view depicting the weight and center of gravity measurement equipment for an aerial vehicle.

The advantages, effectiveness, and essence of the invention can be better understood through a detailed description of preferred embodiments based on accompanying drawings. In the drawings, identical reference numerals are intended to represent similar or equivalent components or details and are used consistently throughout the description. Therefore, in some drawings or parts of the drawing, one or more reference numerals may not appear to simplify and streamline the representation of various structural components or operating principles of the device. In such cases, the relationship between specific components or details and their reference numerals can be clearly illustrated when referencing other drawings or other parts of the drawing. It should be understood that the embodiments described in the detailed description are provided for illustrative purposes to enhance the understanding of the essence and advantages of the invention, without limiting the scope of the invention to the embodiments described.

Figure 2:
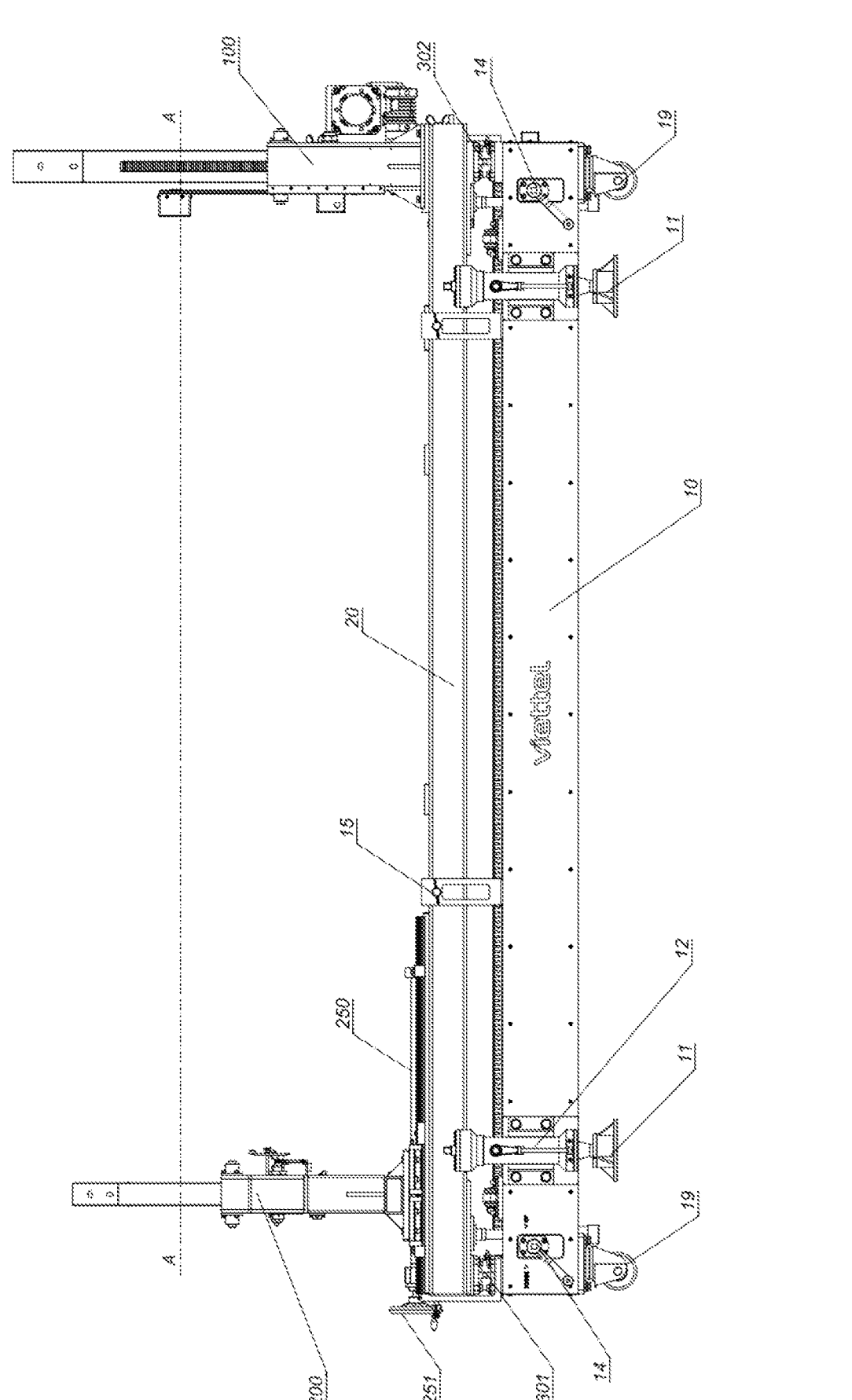
FIG. 2 is a front view showing the weight and center of gravity measurement equipment for an aerial vehicle.
Figure 3:
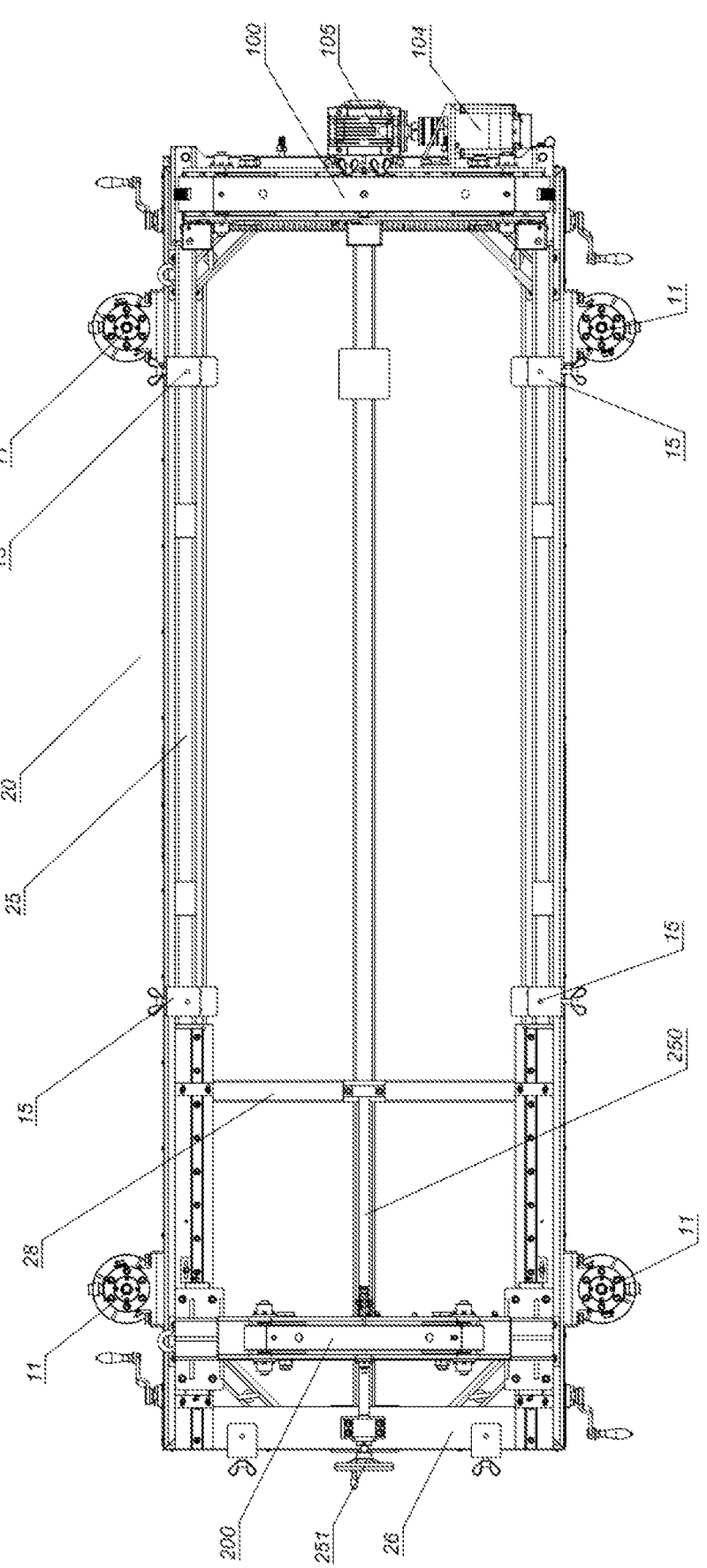
FIG. 3 is a top view illustrating the weight and center of gravity measurement equipment for an aerial vehicle.

As shown in FIG. 1, FIG. 2, and FIG. 3, the weight and center of gravity measurement equipment for an aerial vehicle comprises a base frame (10), an equipment frame (20), the first support component (100), and the second support component (200) arranged at the two ends of the equipment frame (20) to securely hold and clamp the aerial vehicle (30). Three load sensors (301, 302, and 303) are arranged in a triangular pattern between the base frame (10) and the equipment frame (20). The processor (400) is configured to receive signals from these load sensors, calculate the weight and center of gravity of the aerial vehicle (30) based on the load values determined by load sensors 301, 302, 303, and display the results on the screen of this processor.

As can be seen in FIG. 1, the equipment frame (20) serves as the main frame of the device, where the first support component (100) and the second support component (200) are mounted on top of it. The equipment frame (20) has a rectangular shape formed by vertical steel box beams (25) and horizontal steel box beams (26). The frame can be further reinforced by at least one vertical steel beam (27) and/or one horizontal steel beam (28) on the inside. The first support component (100) and the second support component (200) correspondingly consist of the first clamp ring (101) and the second clamp ring (201), designed in a circular structure to firmly hold and support the two ends of the aerial vehicle (30). The first support component (100) and the second support component (200) are positioned opposite each other at the two ends of the equipment frame (20) so that line A-A passing through the center of the first clamp ring (101) and the second clamp ring (201) is parallel to the horizontal plane.

Figure 4:
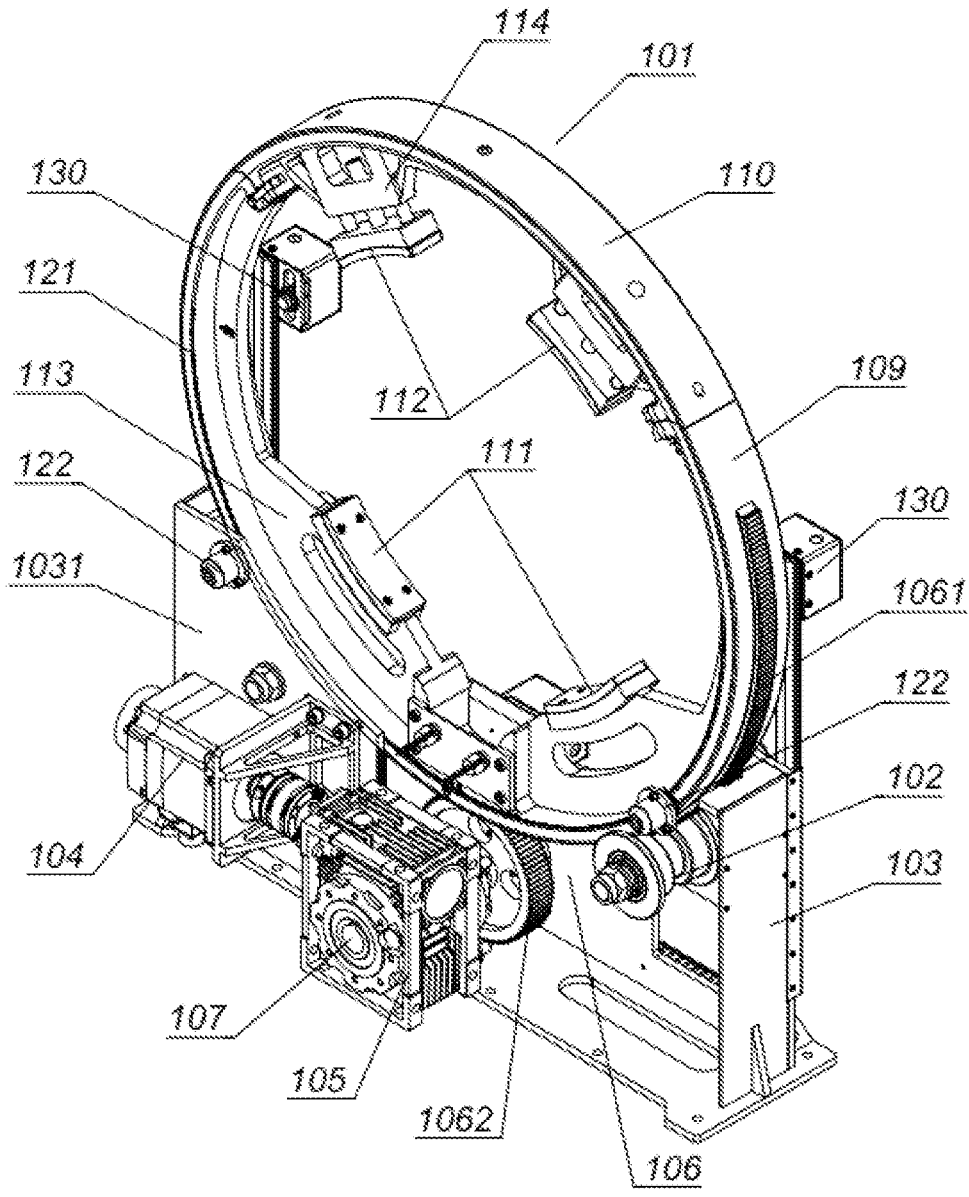
FIG. 4 is an isometric view showing the first supporting component of the weight and center of gravity measurement equipment for an aerial vehicle.
Figure 5:
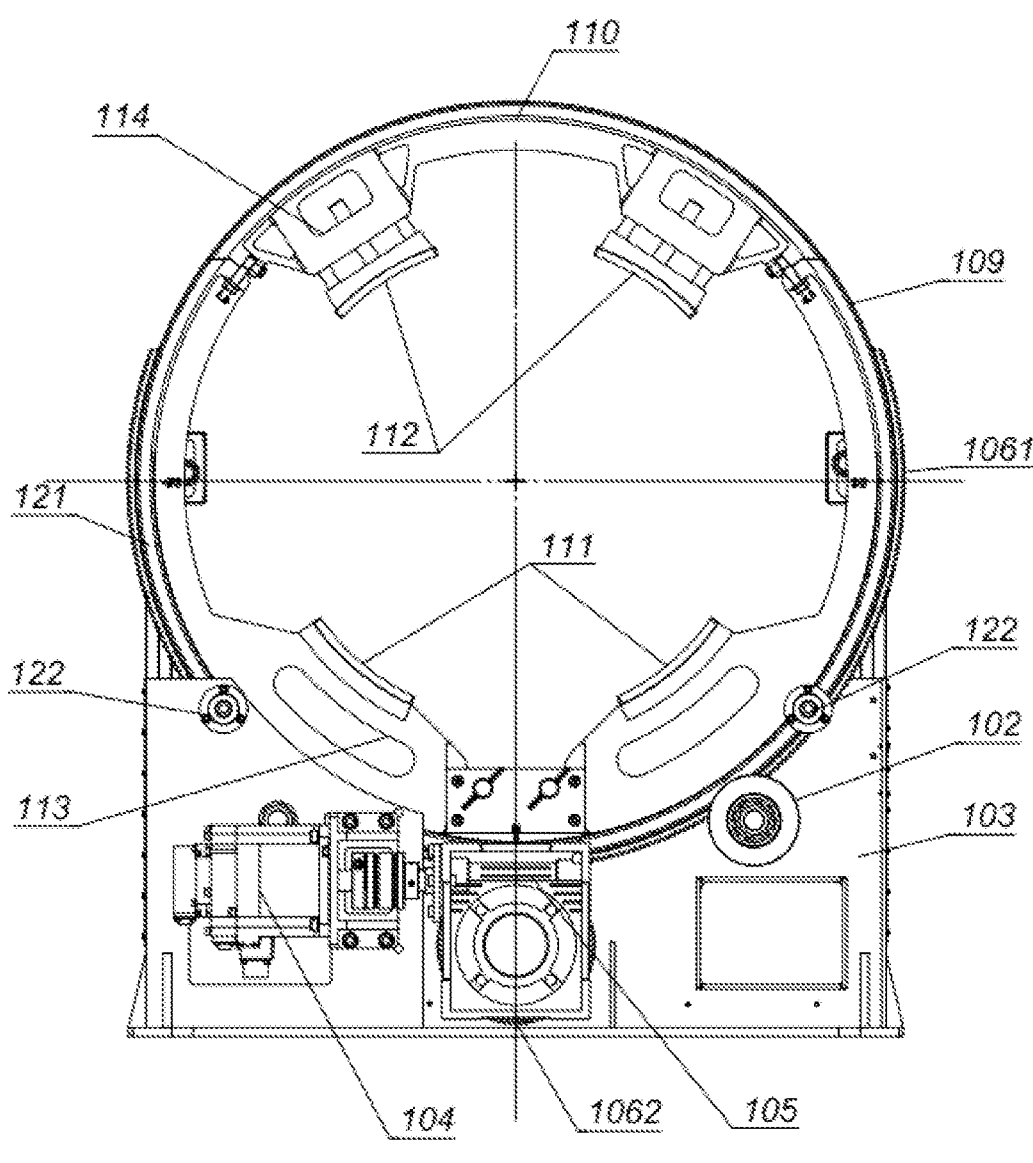
FIG. 5 is a side view of the first supporting component in FIG. 4.

The detailed construction of the first support component (100) is illustrated in FIG. 4 and FIG. 5. As shown in these drawings, the first support component (100) is fixedly attached to one end of the equipment frame (20) and includes the first clamp ring (101), which is designed in a circular structure to secure one end of the aerial vehicle (30). The first clamp ring (101) is mounted in a way that it can rotate on pairs of rollers (102) within the frame of the first clamp ring (103).

The frame of the first clamp ring (103) is structured as a box, consisting of side plates and a bottom plate, where two side plates (1301) are perpendicular to the line A-A mentioned above and have opposite bearing grooves to support the rollers (102). The first clamp ring (101) is mounted between the two side plates (1301) with its outer surface along the tangent direction directly on the rollers (102). Therefore, when driven to rotate, the first clamp ring (101) can move in a predefined angle around the line A-A mentioned above.

However, with this structure, the first clamp ring (101) exhibits shaking and instability when driven to rotate around the normal line A-A. To address this issue, as depicted in FIG. 4, the inventors have arranged an orientation mechanism for the first clamp ring on the first support component (100) to provide orientation and prevent shaking. The orientation mechanism for the first clamp ring is structured with two corresponding orientation grooves (121) created on the two sides of the first clamp ring (101) and orientation ball bearings (122) fixed to the frame of the first clamp ring (103). These ball bearings fit into the orientation grooves (121) to provide orientation and prevent shaking for the first clamp ring (101) when it rotates.

Figure 6:
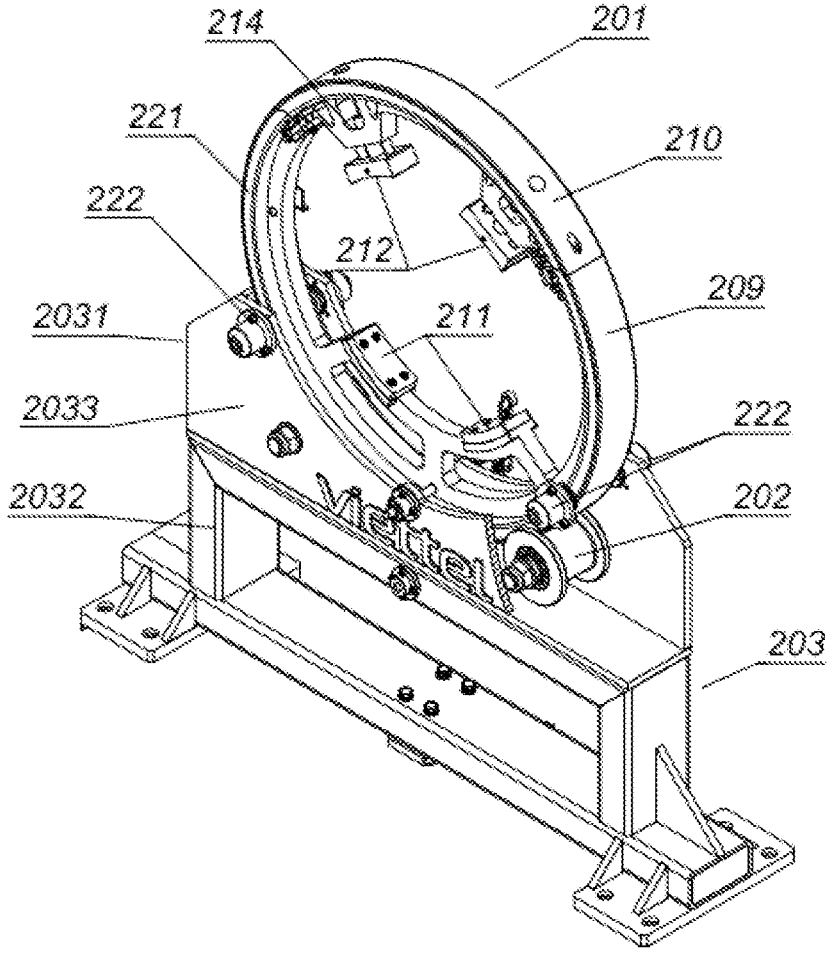
FIG. 6 is a partial cross-sectional isometric view depicting the second supporting component of the weight and center of gravity measurement equipment for an aerial vehicle.
Figure 7:
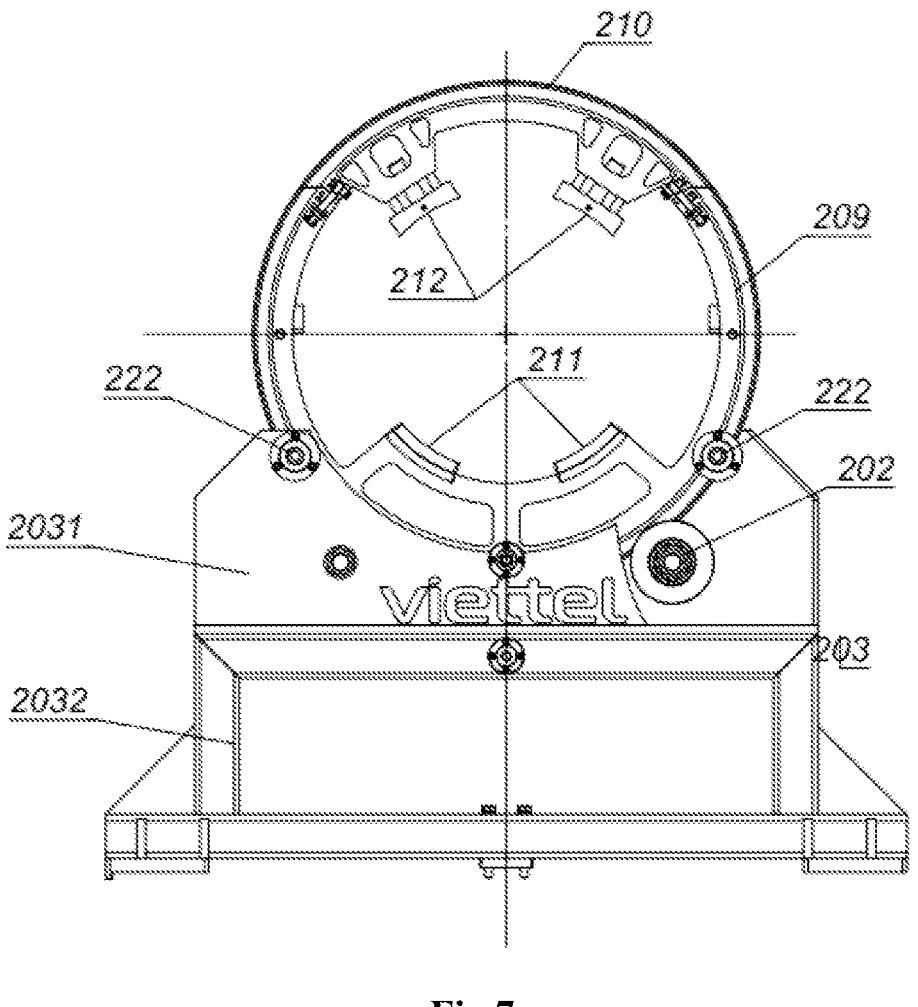
FIG. 7 is a side view of the second supporting component in FIG. 6.

Next, the construction of the second support component (200) will be described. As shown in FIG. 6, FIG. 7, and FIG. 1, the second support component (200) consists of the second clamp ring (201), designed in a circular structure to secure the remaining end of the aerial vehicle (30). The second clamp ring (201) is mounted in a way that it can rotate on pairs of rollers (202) within the frame of the second clamp ring (203). The frame of the second clamp ring (203) includes the upper frame (2031) fixed to the lower frame (2032). The upper frame (2031) is in the form of a box, with two side plates (2033) perpendicular to the line A-A mentioned above. These two side plates (2033) have opposite bearing grooves to support the rollers (202). The second clamp ring (201) is mounted between these two side plates (2033) with its outer edge along the radial direction in direct contact with the rollers (202). Consequently, the second clamp ring (201) can rotate around the line A-A mentioned above when driven.

To prevent shaking of the second clamp ring (201), as shown in FIG. 6 and FIG. 7, an orientation mechanism for the second clamp ring is arranged on the second support component (200). The orientation mechanism for the second clamp ring is structured with two corresponding orientation grooves (221) created on the two sides of the second clamp ring (201) and orientation ball bearings (222) fixed to the upper frame (2031) so that the ends of these orientation ball bearings (222) always fit into the orientation grooves (221), ensuring orientation and preventing shaking for the second clamp ring (201) during its rotational motion.

The second support component (200) can be fixedly attached to the remaining end of the equipment frame (20). However, in this approach, the distance between the first support component (100) and the second support component (200) remains a fixed distance L. Therefore, the invention's equipment can only determine the weight and center of gravity of the aerial vehicle (30) with a corresponding length or greater than the distance between these two components. To determine the weight and center of gravity of shorter aerial vehicles, another preferred embodiment allows the second support component (200) to be mounted on the equipment frame (20) in a way that it can slide along the length of the frame.

As shown in FIG. 1, below the second support component (200), there are two sliders (240) that can slide on corresponding rails (241) attached to the two outermost steel box sections (25) of the equipment frame (20). This allows the distance between the second support component (200) and the first support component (100) to be adjusted to be less than the fixed distance L. The distance adjustment between the second support component (200) and the first support component (100) is achieved through a lead screw mechanism (250) that can be turned using a handwheel (251).

Figure 8:
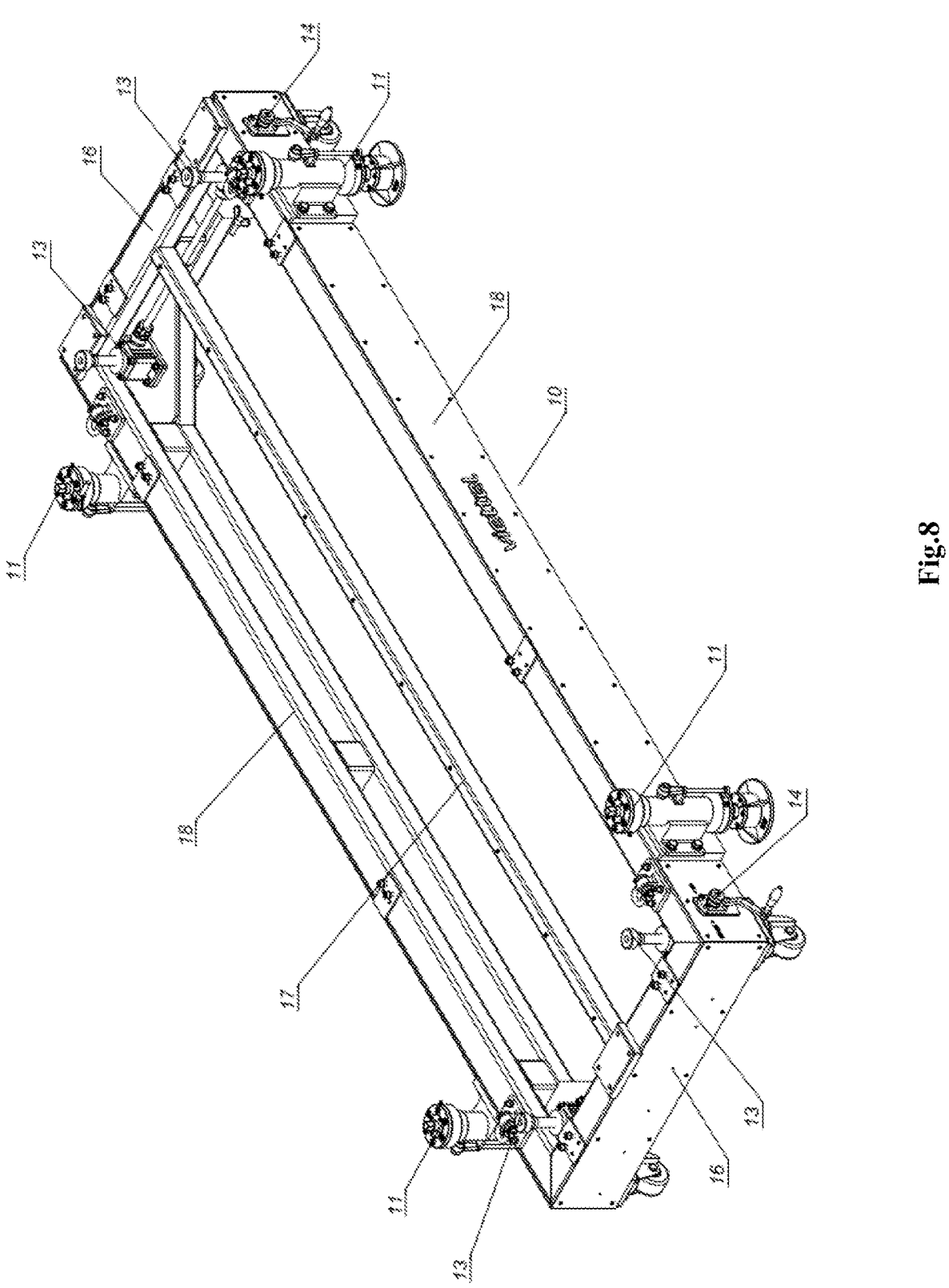
FIG. 8 is an overall isometric view of the base frame of the invention's weight and center of gravity measurement equipment for an aerial vehicle.

As demonstrated in FIG. 8, the base frame (10) is structured as a rectangular frame. When viewed in a top view projection, the base frame (10) has dimensions and fundamental details that are similar to the equipment frame (20). Specifically, the frame (10) is a rectangular structure created by vertical steel box sections (18) and horizontal steel box sections (16). The inside of the base frame (10) can be reinforced with at least one vertical steel box section (17) and/or a horizontal steel box section.

Three load sensors 301, 302, 303 are arranged in a triangular pattern between the base frame 10 and the equipment frame 20, as shown in FIG. 1. In this arrangement, the second and third load sensors 302 and 303 are positioned below the first supporting component 100 and are symmetrical with respect to the vertical plane passing through the line A-A mentioned above. It is preferable that these two sensors are located at the corners of the base frame 10 to support the corners of the equipment frame 20. The first load sensor 301 is positioned to support the central position underneath the horizontal box steel bar 26 of the equipment frame 20. In this arrangement, the center of the first load sensor 301 is essentially on the vertical plane passing through the line A-A.

The processor (400) is configured to receive signals from the load sensors (301, 302, and 303), calculate the weight and center of gravity of the aerial vehicle (30) based on the load values of the aerial vehicle (30) determined by these load sensors, and display the results on the processor's screen. The principle for calculating the center of gravity of the aerial vehicle (30) by the processor (400) involves using moment equilibrium equations and trigonometric equations (to be described later) based on the load values of the aerial vehicle (30) detected by the load sensors (301, 302, 303) at the initial position of the aerial vehicle (30) when placed on the equipment and at the positions where the aerial vehicle (30) is rotated at predetermined angles.

As shown in FIG. 1, FIG. 4, and FIG. 6, for the convenience of installing the aerial vehicle (30) onto the first clamping ring (101) and the second clamping ring (201), each clamping ring is structured to include two parts: the lower ring part (109, 209) and the upper ring part (110, 210) that can be disassembled and connected using bolts. The lower ring part (109, 209) has a circumference larger by at least ⅔ times than the upper ring part (110, 210).

The lower ring part (109, 209) of each clamping ring consists of two fixed jaw parts (111, 211) attached to raised sections (113, 213) that extend radially from the inside of the lower ring part (109, 209). It's preferable that the raised sections (113, 213) are integral with the lower ring part (109, 209).

The upper ring part (110, 210) of each clamping ring has mobile clamping jaws (112, 212) attached to raised sections (114, 214) that extend radially inward from the inside of the upper ring part (110, 210) using adjustable bolts. When these bolts are adjusted, the mobile clamping jaws (112, 212) move radially towards the clamping ring's center, effectively clamping or releasing the aerial vehicle. It is preferable that the raised sections 114, 214 are integrally formed with the upper ring part 110, 210.

The first clamping ring (101) is driven to rotate at predetermined angles α around the A-A axis by a servo motor (104) through a gearbox (105) and a transmission mechanism (106). The transmission mechanism (106) consists of a passive gear ring (1061) that wraps around the outside of the lower ring part (109) and meshes with an active gear (1062) fixed on the rotation shaft (107) of the gearbox (105). The servo motor (104) is controlled to rotate by a controller (500). The controller (500) is configured to receive commands to rotate the first clamping ring (101) to predetermined angles α.

So, when the aerial vehicle (30) is fixed on the two clamping rings (101 and 201), and the user controls the first clamping ring (101) to rotate at predetermined angles, the aerial vehicle (30) and the second clamping ring (201) will also rotate correspondingly around the A-A axis. However, because the first clamping ring (101) is driven to rotate through the transmission mechanism (106), there may be a certain deviation in the actual rotation angle of the first clamping ring (101) compared to the predetermined angle α. To address this issue, the inventors have used proximity sensors (130) to detect the predetermined rotation angle α of the first clamping ring (101). These proximity sensors (130) are placed at corresponding positions on the clamping ring support frame (103) to detect specific rotation angles of the first clamping ring (101), such as 0 degrees, ±30 degrees, ±45 degrees, ±60 degrees, and ±90 degrees. The 0-degree angle is defined such that the lowest point of the first clamping ring (101) lies in the vertical plane passing through the A-A line. The controller (500) receives a command to control the rotation of the first clamping ring (101) to the predetermined angles α, and it stops at each position for a predetermined time to measure and record the force values detected by the load sensors (301, 302, 303). In a preferred embodiment, the clamping ring support frame (103) has three proximity sensors (130) arranged to detect rotation angles of the first clamping ring (101) at 0 degrees and ±90 degrees.

In one implementation, as shown in FIG. 8 and FIG. 1, the base frame 10 of the equipment is equipped with movable wheels 19 at the bottom and adjustable lifting legs 11 independently controlled by adjustment arms 12. Each lifting leg 11 is a screw mechanism raised/lowered by the adjustment arms 12, allowing the user to adjust it so that the plane passing through the positions of the load sensors 301, 302, 303 on the base frame 10 is horizontal. Simultaneously, because the equipment frame 20 and its upper components have substantial weight, for easy maintenance, repair, or replacement of the load sensors 301, 302, 303, the base frame 10 also includes two lifting mechanisms arranged at two its ends to raise the equipment frame 20 to a higher position. Ideally, each lifting mechanism consists of two manually operated screw lifters 13 arranged at the corners of the base frame 10. Furthermore, to prevent the equipment frame 20 from sliding off the base frame 10 in case of accidents, the inventors have installed U-shaped safety brackets 15 fixed around the base frame 10, covering the gaps around the vertical steel bars 25 and horizontal steel bars 26 of the equipment frame 20.

In the description above, the construction of the weight and center of gravity measurement equipment for an aerial vehicle has been explained in detail. Next, the principle of determining the weight and center of gravity of the aerial vehicle 30 using the moment equilibrium equations performed by the processor 400 will be described in more detail, along with the method of determining the center of gravity of the aerial vehicle according to the invention.

As shown in FIG. 11, the method for determining the center of gravity of the aerial vehicle 30 using the invention's equipment includes the following steps:

Step S101: Fix the aerial vehicle (30) onto the first clamping ring (101) and the second clamping ring (201) of the equipment.

Step S102: Measure the initial load values $F_1$, $F_2$, and $F_3$ using the load sensors (301, 302, and 303).

Step S103: Calculate the weight and the coordinates of the center of gravity (CG) of the aerial vehicle (30) along the X and Y axes at the initial position.

Step S104: Rotate the aerial vehicle (30) around the A-A axis (the line connecting the centers of the first clamping ring (101) and the second clamping ring (201)) by a predetermined angle α.

Step S105: Measure the second set of load values, $F_1'$, $F_2'$, and $F_3'$, using the load sensors (301, 302, 303).

Step S106: Calculate the weight (W) and the coordinates of the center of gravity (CG) of the aerial vehicle along the X, Y, and Z axes at the position that has been rotated by the predetermined angle α.

Step S107: Calculate the final coordinate value.

In which:

Step S103: Calculate the weight and center of gravity (CG) coordinates of the aerial vehicle 30 along the X and Y axes at the initial position, where:

The weight of the aerial vehicle 30 is the sum of the force values determined by the load sensors and is represented by the following equation:

$$W = F_1 + F_2 + F_3 \qquad \text{(Equation a)}$$

Where W is the weight of the aerial vehicle 30.

Figure 9A:
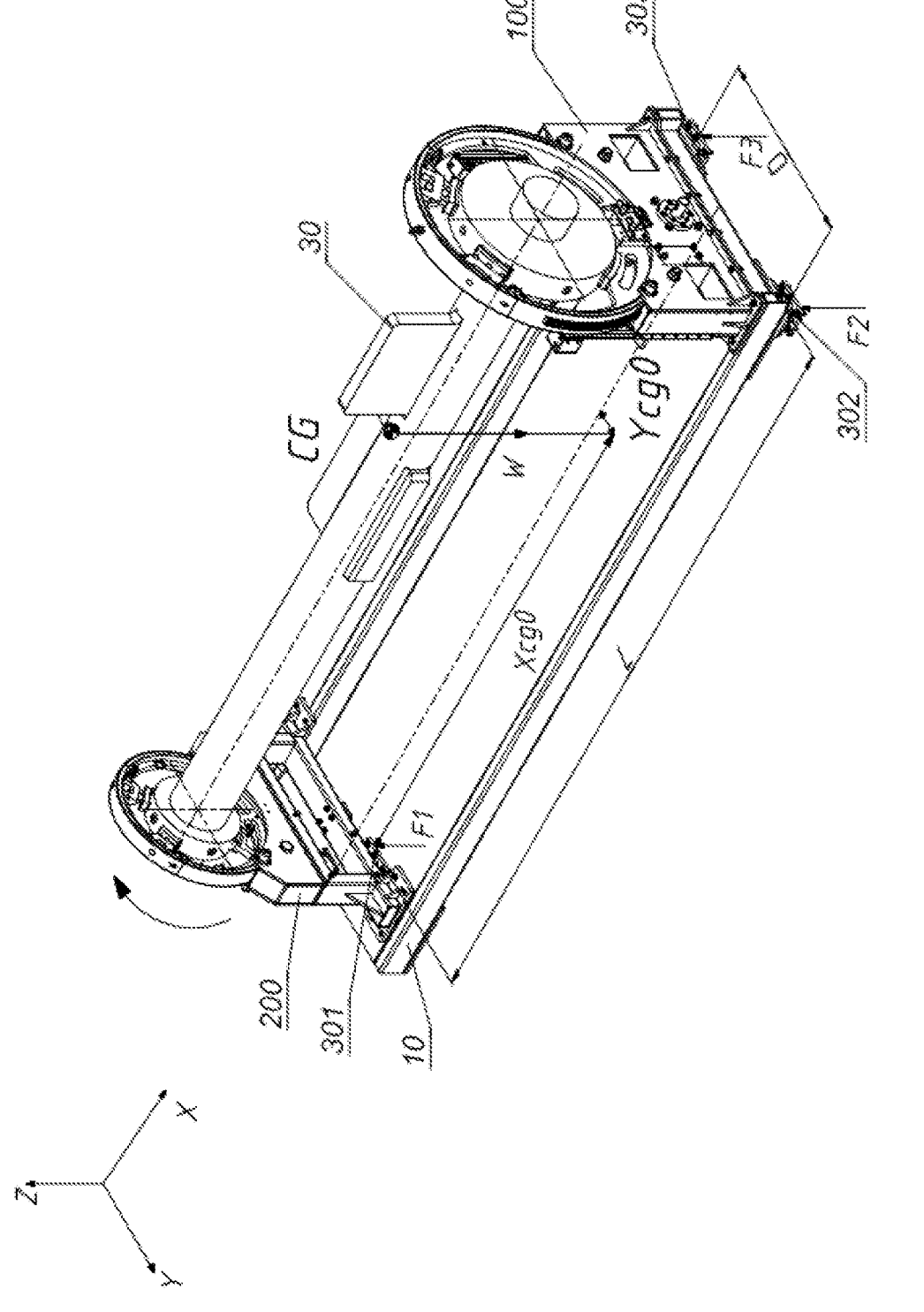
FIG. 9a is an isometric drawing illustrating the installation of the aerial vehicle on the equipment along with the vehicle's dimensions, load, and center of gravity position.
Figure 12:
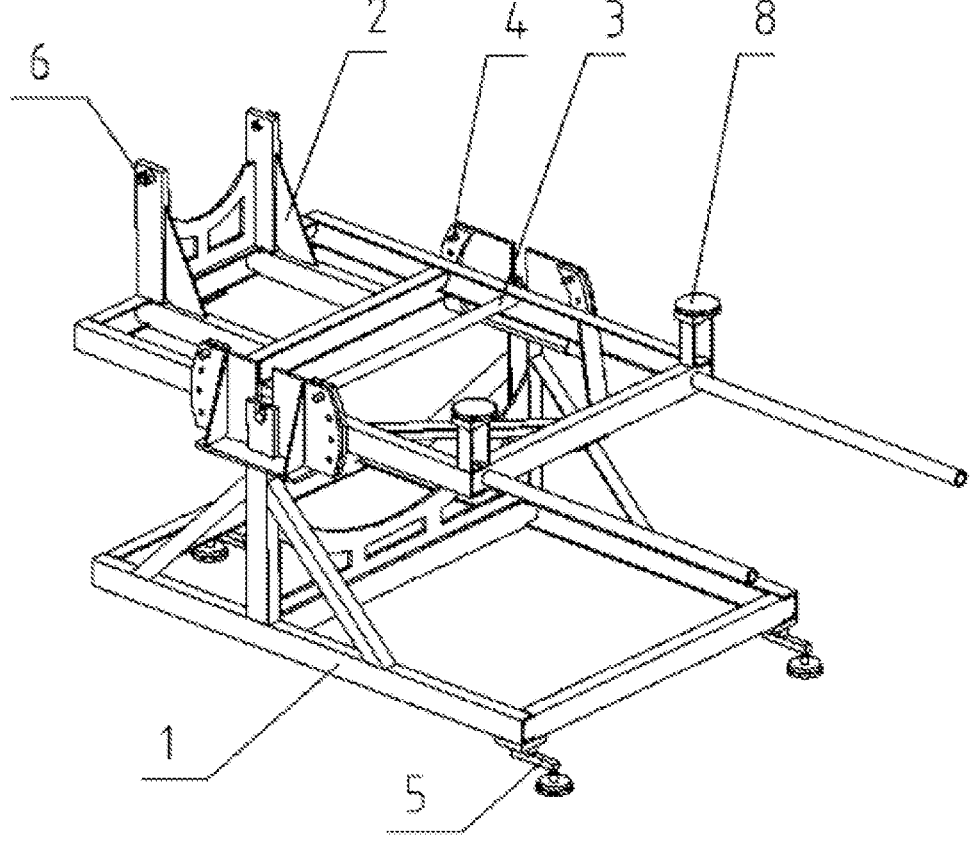
FIG. 12 is an overall isometric view depicting the weight and center of gravity measurement equipment for an aerial vehicle.

Calculating the initial center of gravity (CG) coordinates of the aerial vehicle 30 along the X and Y axes at the initial position is the step to determine the CG coordinate values of the aerial vehicle 30 using the moment equilibrium equations based on the load values measured in step S102. Referring to FIG. 9a and FIG. 10a, the CG coordinates along the X and Y axes at the initial position of the aerial vehicle 30 are determined by taking moments with respect to the first force sensor 301. This results in the coordinate values $X_{CG0}$ and $Y_{CG0}$ according to equations (1) and (2) below.

$$\Sigma M_X = (F_2 + F_3)L - WX_{CG0} = 0 \implies X_{CG0} = \frac{(F_2 + F_3)L}{w} \quad \text{(The equation 1)}$$

$$\Sigma M_Y = \frac{(F_3 - F_2)D}{2} - WY_{CG0} = 0 \implies Y_{CG0} = \frac{(F_3 - F_2)D}{2W} \quad \text{(The equation 2)}$$

Where:

$\Sigma M_X$: The total moment about the X-axis with respect to the first load sensor 301;

$\Sigma M_Y$: The total moment about the Y-axis with respect to the first load sensor 301;

L: The distance along the X-axis between the first load sensor 301 and the second load sensor 302;

D: the distance along the Y-axis between the second load sensor 302 and the third load sensor 303.

$F_1$, $F_2$, $F_3$: the load values detected by the first load sensor 301, the second load sensor 302, and the third load sensor 303 at the initial position.

W: the weight of the aerial vehicle 30 as determined by the equation a.

$X_{CG0}$: the center of gravity coordinate along the X-axis of the aerial vehicle 30 at the initial position.

$Y_{CG0}$: the center of gravity coordinate along the Y-axis of the aerial vehicle 30 at the initial position.

Next, in step S104, rotating the aerial vehicle 30 by a predetermined angle α is performed by controlling the servo motor 104 to drive the first clamp ring 101 of the first support component 100 to rotate by the predetermined angle α around the A-A axis. It is preferable that the predetermined angle α is a specific angle for the convenience of calculating the static equilibrium moment equation. The predetermined angle α can be, for example, ±30 degrees, ±45 degrees, ±60 degrees, and best at ±90 degrees.

After the rotation, the center of gravity position along the X-axis remains unchanged. However, the center of gravity position along the Y-axis changes from the initial position Y_CG0 to a new position Y_CG1, as shown in FIG. 9b and FIG. 10b.

In step S106, calculating the center of gravity (CG) coordinate values along the X, Y, Z axes of the aerial vehicle 30 at the predetermined rotated position is performed. The coordinate values $X_{CG1}$ and $Y_{CG1}$ at this position are calculated according to the equation 1 and the equation 2. Based on the diagram shown in FIG. 10b, establish equations that express the relationship to calculate the value $Z_{CG0}$ based on $Y_{CG0}$, $Y_{CG1}$, and the rotation angle α as follows:

$$Z_{CG0} = R \cdot \sin \theta \qquad \text{(Equation 3)}$$

$$Y_{CG0} = R \cdot \cos \theta \qquad \text{(Equation 4)}$$

$$Y_{CG1} = R \cdot \cos (\theta + \alpha) = R \cdot \cos \theta \cdot \cos \alpha - R \sin \theta \cdot \sin \alpha \qquad \text{(Equation 5)}$$

Where:

$Z_{CG0}$: The center of gravity coordinate along the Z-axis.

R: The distance from the A-A axis of rotation to the center of gravity position.

θ: The angle formed by the line connecting the center of rotation and the initial center of weight position with the horizontal plane.

$Y_{CG1}$: The value calculated according to the equation 2 but with the values F2, and F3 replaced by F'2, and F'3, which are detected by the second and third load sensors at step S105.

Replacing the equations 3 and 4 into the equation 5, we obtain the equation for calculating the center of gravity coordinate along the Z-axis as follows:

$$Z_{CG0} = Y_{CG0} \cdot \cot\alpha - \frac{Y_{CG1}}{\sin\alpha} \qquad \text{(Equation 6)}$$

For the case of the aerial vehicle rotating with an angle α=90°, the equation 6 is simplified to $$Z_{CG0} = Y_{CG1} \qquad \text{(Equation 7)}$$

Finally, in step S107, calculate the final coordinate values. This step involves computing the weight and average coordinate values of the coordinate values of the aerial vehicle 30 obtained from step S103 (initial coordinate values) and step S106 (calculating coordinate values at the new position).

According to this center of weight measurement method, steps S104-S106 can be repeated multiple times to obtain the center of mass coordinate values of the aerial vehicle at different rotation angles. Thus, more accurate center of mass coordinate values of the aerial vehicle can be obtained by calculating the average center of mass coordinate value from the obtained values.

In the above description, the invention has been detailed according to preferred embodiments, and it may include alternative or equivalent embodiments or specific examples, using appropriate descriptions and terminology so that individuals with average knowledge in this technical field can understand and implement the inventive solution. Therefore, individuals with average knowledge in the corresponding technical field can readily make changes, modifications, or equivalent substitutions based on the content and implementations described. As a result, these changes, modifications, or equivalent substitutions are considered to be within the scope of the invention, and the scope of protection for the invention is not limited by the contents and implementations described but is determined by the claims below.

The invention claimed is:

1. A weight and center of gravity measurement equipment for aerial vehicles comprises:

a base frame (10) constructed in a rectangular structure:

an equipment frame (20) positioned above the base frame (10), with the equipment frame (20) also having a rectangular structure to support a first support component (100) and a second support component (200);

the first support component (100) includes a first clamp ring (101) mounted in a rotatable manner on first pairs of rollers (102) attached to a first support frame (103), the first clamp ring (101) is designed in a circular ring shape to securely clamp a first end of the aerial vehicle (30);

the second support component (200) comprises a second clamp ring (201) mounted in a rotatable manner on second pairs of rollers (202) attached to a second support frame (203), the second clamp ring (201) is designed in a circular ring shape to securely clamp a second end of the aerial vehicle (30);

the first support component (100) and the second support component (200) are arranged opposite each other at two ends of the equipment frame (20) so that a line (A-A) connecting centers of the first (102) and second (202) clamp rings of these two support components is parallel to a horizontal plane;

the first clamp ring (101) is driven to rotate at predefined angles α around the line (A-A) by a servo motor (104) through a gearbox (105) and a transmission mechanism (106), the transmission mechanism comprises a passive gear ring (1061) attached around an outside of the first clamp ring (101) and meshing with an active gear (1062) mounted on a shaft (107) of the gearbox (105);

first, second and third load sensors (301, 302, 303) are arranged in a triangular pattern between the base frame (10) and the equipment frame (20), the first load sensor (301) is positioned below the second support component (200), while the second and third load sensors (302 and 303) are located below the first support component (100) and are symmetrically placed with respect to a vertical plane passing through the line (A-A) mentioned above;

a processor (400) is configured to receive signals from the load sensors (301, 302, 303), calculate the weight and center of gravity of the aerial vehicle (30) based on load values of the aerial vehicle (30) determined by the load sensors (301, 302, 303) at an initial position and at each position where the first clamp ring (101) rotates at the predefined angles α, the results are then displayed on a processor display screen.

2. The weight and center of gravity measurement equipment according to claim 1, wherein the base frame (10) also includes lifting legs (11) with adjustable heights through adjusting arms (12), allowing users to adjust the lifting legs so that the plane passing through the positions of load sensors (300) on the base frame (10) is horizontal.

3. The weight and center of gravity measurement equipment according to claim 1, wherein the equipment further includes U-shaped safety brackets (15) fixedly attached around the base frame (10) to prevent the equipment frame (20) from sliding off the base frame (10) in case of an incident.

4. The weight and center of gravity measurement equipment according to claim 1, in which each first or second clamp ring (101, 201) consists of a respective lower ring part (109, 209) and a respective upper ring part (110, 210) that can be assembled from each other.

5. The weight and center of gravity measurement equipment according to claim 4, wherein the lower ring parts (109, 209) have fixed clamping jaws (111, 211), and the upper ring parts (110, 210) have movable clamping jaws (112, 212) that can be adjusted in a radial direction of the clamp ring to securely hold the aerial vehicle (30) between these fixed and movable jaws.

6. The weight and center of gravity measurement equipment according to claim 1, wherein the first support component (100) further comprises an orientation mechanism for the clamp ring (120), which is structured with two corresponding orientation grooves (121) created on two side surfaces of the first clamp ring (101), and orientation ball bearing components (122) fixed to the first support frame (103) so that ends of the ball bearing components fit into the orientation grooves (121) to orient the first clamp ring (101).

7. The weight and center of gravity measurement equipment according to claim 6, wherein the second support component (200) further comprises an orientation mechanism for the clamp ring (220), which is structured with two corresponding orientation grooves (221) created on two side surfaces of the second clamp ring (201), and orientation ball bearing components (222) fixed to the second frame (203) so that ends of the ball bearing components fit into the orientation grooves (221) to orient the second clamp ring (201).

8. The weight and center of gravity measurement equipment according to claim 1, wherein the base frame (10) further includes two lifting mechanisms (13) arranged at both ends of the frame to lift the equipment frame (20) when performing maintenance, repair, or replacing load sensors (300).

9. The weight and center of gravity measurement equipment according to claim 8, wherein each lifting mechanism (13) consists of two manually operated screw lifters arranged at corners of the base frame (10).

10. The weight and center of gravity measurement equipment according to claim 1, wherein the first support component (100) is fixedly mounted on the equipment frame (20), and the second support component (200) is slidably movable along a length of the equipment frame (10) to change a distance from the first support component (100) to match a length of the aerial vehicle (30).

11. The weight and center of gravity measurement equipment according to claim 10, wherein the second support component (200) can slide along a length of the base frame (10) to change a distance from the first support component (100) using a lead screw mechanism (250) with an with adjusting handles (251).

12. The weight and center of gravity measurement equipment according to claim 1, wherein the first support component (100) also includes proximity sensors (130) to detect the predefined angle of rotation a of the first clamp ring (101).

13. The weight and center of gravity measurement equipment according to claim 12, wherein the proximity sensors (130) are positioned at specific locations to detect specific angles of rotation $\alpha$ of the first clamp ring (101), including 0 degrees, ±30 degrees, ±45 degrees, ±60 degrees, and ±90 degrees.

14. The weight and center of gravity measurement equipment according to claim 12, wherein three proximity sensors (130) are positioned at corresponding locations to detect specific angles of rotation $\alpha$ of the first clamp ring (101) at 0 degrees and ±90 degrees.

15. The weight and center of gravity measurement equipment according to the claim 12, wherein the equipment further includes a controller (500) configured to receive commands and control the servo motor (104) to rotate the first clamp ring (101) to positions of $\alpha$ angles detected by the proximity sensors (130) and stop at each of these positions for a predetermined period.

\* \* \* \* \*